United States Patent
Harlow et al.

(10) Patent No.: US 7,949,111 B2
(45) Date of Patent: *May 24, 2011

(54) CALL ROUTING METHOD

(75) Inventors: John Bruce Harlow, Middletown, NJ (US); Robert J. Sayko, Colts Neck, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 706 days.

This patent is subject to a terminal disclaimer.

(21) Appl. No.: 11/969,694

(22) Filed: Jan. 4, 2008

(65) Prior Publication Data

US 2008/0101571 A1    May 1, 2008

Related U.S. Application Data

(63) Continuation of application No. 10/261,297, filed on Sep. 30, 2002, now Pat. No. 7,327,837.

(51) Int. Cl.
*H04M 15/00* (2006.01)
*H04M 3/00* (2006.01)
*H04M 7/00* (2006.01)

(52) U.S. Cl. ............ 379/114.14; 379/196; 379/221.01; 379/221.09

(58) Field of Classification Search .......... 379/111, 379/112.01, 114.01, 114.14, 118, 127.01, 379/133–134, 188–189, 196–197, 219, 220.01, 221.01–221.14, 32.01–32.05; 455/410, 445

See application file for complete search history.

(56) References Cited

U.S. PATENT DOCUMENTS

| | | | |
|---|---|---|---|
| 5,357,564 A | 10/1994 | Gupta et al. | |
| 5,555,551 A | 9/1996 | Rudokas et al. | |
| 5,883,948 A | 3/1999 | Dunn | |
| 5,937,043 A | 8/1999 | He | |
| 5,949,871 A | 9/1999 | Kabay et al. | |
| 6,212,266 B1 * | 4/2001 | Busuioc | 379/189 |
| 6,233,313 B1 | 5/2001 | Farris et al. | |
| 6,396,915 B1 | 5/2002 | Springer et al. | |
| 6,442,265 B1 | 8/2002 | Harlow et al. | |
| 6,519,331 B1 | 2/2003 | Stevens et al. | |
| 6,801,606 B1 | 10/2004 | Edwards | |
| 6,816,722 B2 * | 11/2004 | Blom et al. | 455/410 |
| 7,327,837 B1 * | 2/2008 | Harlow et al. | 379/114.14 |

* cited by examiner

*Primary Examiner* — Quoc D Tran

(57) ABSTRACT

A call processing method is disclosed. A first station initiates a call to a second station. Call information associated with the initiated call is evaluated by comparing the call information with information in a fraud database. Completion of the call is prevented if the evaluation results in a finding of fraud. If the evaluation results in no finding of fraud, the call is completed to the second station via a routing path obtained from a routing database. If the call being completed is deemed to be a call of interest, the routing path obtained from the routing database for completing the call is stored.

20 Claims, 2 Drawing Sheets

CALL ROUTING METHOD

This application is a continuation of U.S. patent application Ser. No. 10/261,297, filed on Sep. 30, 2002 now U.S. Pat. No. 7,327,837, entitled CALL ROUTING METHOD (currently allowed), which is incorporated herein by reference.

FIELD OF THE INVENTION

The present invention relates generally to routing of telephone calls and more particularly to a method of routing certain types of calls via specific paths.

BACKGROUND OF THE INVENTION

The routing of telephone calls is well known. As the demand for communications has grown over the past several decades, newer routing methods and strategies have been developed. Some of the factors considered in routing calls include network congestion and cost. Routing information is typically stored in a routing database.

Fraud detection in telephone calls is also well known. Typically, when a phone call is initiated, it is analyzed by comparing the call information with archived information. The archived information is stored in a fraud database. The fraud database provides instructions to a switch on how to process the call, such as completion or redirection.

If the call is not to be completed, it may be blocked or redirected to a service agent for validation. If the call is to be completed, on the other hand, the switch obtains routing information for completing the call from a routing database.

In existing systems, questionable calls (or potentially fraudulent or suspicious calls) are treated as regular calls if no archived information about the calling party or location is available, for example. That is, potentially fraudulent calls are routed like non-fraudulent calls. Routing typically entails the selection of facilities (such as trunks, lines and wires), equipment (such as switches and devices that switch calls and modulate the voice signal) and circuits (forming the switches and devices). Once a call is routed, the network is not able to easily access the particular circuits and equipment handling a specific call.

In addition, monitoring of calls, such as in a court-ordered wire tapping for example, is presently a time-consuming and manually intensive effort.

SUMMARY OF THE INVENTION

Methods and systems consistent with the present invention provide a call routing method through which certain calls are routed via a specific, predetermined path in order to control said calls.

A method consistent with the present invention includes a first station initiating a call to a second station. Call information associated with the initiated call is evaluated by comparing it with information in a fraud database. If the call is determined to be fraudulent, completion of the call is prevented. If the call is determined not to be fraudulent, it is completed to the second station via a routing path obtained from a routing database. The completion further includes storing routing information if the call is deemed to be a call of interest.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Methods and systems consistent with the present invention provide a mechanism through which potentially fraudulent calls are monitored and controlled. The monitoring may be accomplished by routing calls through a specific route.

Figure 1A:
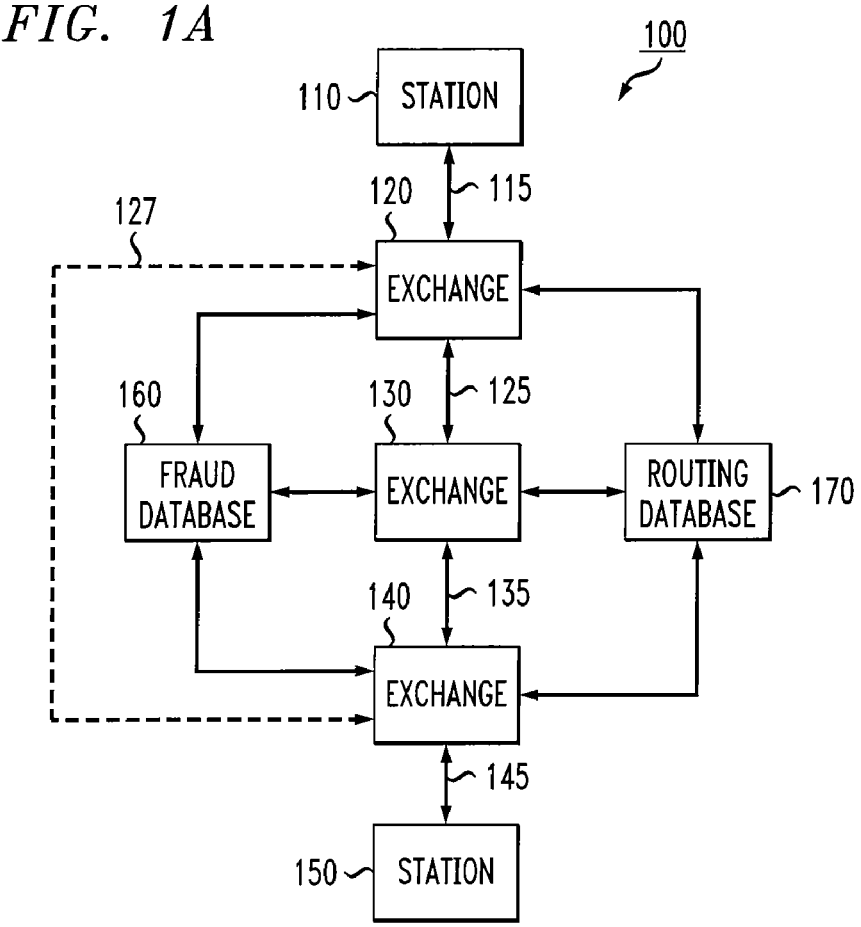
FIG. 1A illustrates a communication system with a plurality of stations and exchanges.

FIG. 1A illustrates an exemplary telecommunications system 100. The communication system 100 includes multiple stations between which communication may take place. Two such stations, 110 and 150, are illustrated. A telephone call may be initiated from station 110 to station 150 for example (or from station 150 to station 110). The two stations may be connected via one or more exchanges. Three such exchanges, 120, 130 and 140, are illustrated. In the illustrated example, station 110 is connected directly with exchange 120 via path 115 and station 150 is connected directly with exchange 140 via path 145. Exchanges 120 and 140 may be connected to each other either directly or via an intermediate exchange such as exchange 130. Exchange 120 may be connected to exchange 130 via trunk group 125 and to exchange 140 via trunk group 127. Exchange 130 may be connected to exchange 140 via trunk group 135. The system 100 may also include a fraud database 160 and a routing database 170. Each of these two databases may be connected to each of the exchanges.

Figure 1B:
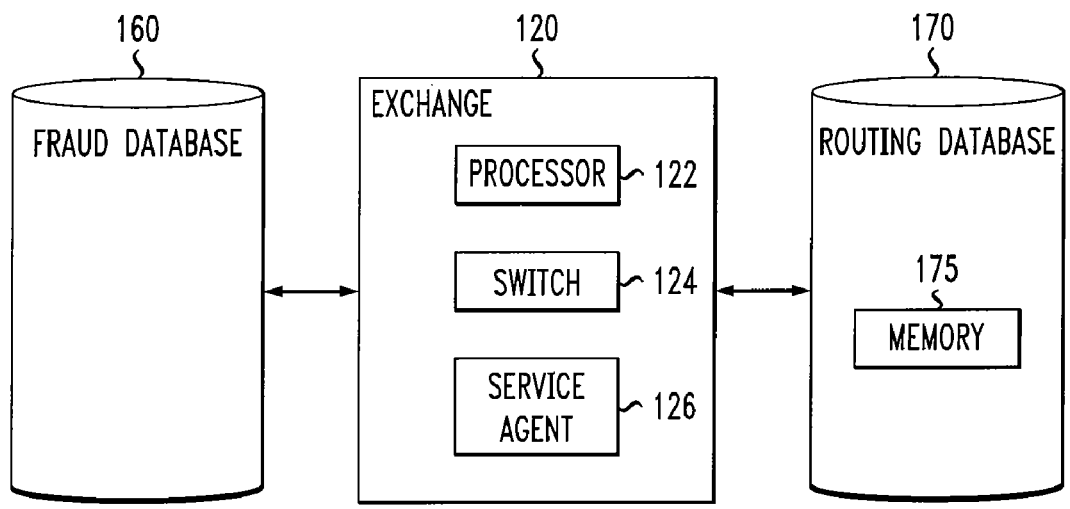
FIG. 1B illustrates various components of an exchange.

FIG. 1B illustrates components of each of the exchanges. Exchange 120, for example, may include a processor 122, a switch 124 and a service agent 126. In addition, the exchange 120 may include a computer-readable medium containing instructions for controlling the processor 122 to perform a call processing method, discussed below. Similarly, exchanges 130 and 140 each may include a processor, a switch and a service agent. Exchange 120 may also be connected to fraud database 160 and routing database 170. The routing database 170 may include a memory location 175 for storing specific, dedicated route information.

Upon initiation of a call by station 110 to station 150, the switch 124 at exchange 120 queries the fraud database 160 for fraud analysis of the call. A processor 122 may compare call information with archived information from the fraud database 160. The call information may include such parameters as the calling party number and location, the called party number and location, calling card number and the personal identification number (PIN) used to make the call in case of a calling card call, credit card number used if the call is a credit card call and the amount of time or dollar amount remaining on a prepaid card if such a card is used to make the call.

The archived information may include profiles of phone company customers such as call history, bill payment history, length of subscription, calling card number and corresponding PIN. Other information may include location and type of the phones corresponding to phone numbers, such as pay phones. The call information is compared to certain threshold values derived from the archived information; and if the threshold values are exceeded, the telephone call may be blocked or redirected to a service agent for validation and/or completion. If, on the other hand, the threshold values are not exceeded, the call will be completed. This detection is premised on having archived information from past history or from other sources, such as credit reporting agencies for example. A threshold value may be a customer not paying his telephone bill for the last three months, for example.

If comparison between the call information and archived information in the fraud database 160 results in a determination that this call is fraudulent or should not be processed because the caller has not entered the correct PIN for a calling card for example, the call is not completed or the call is redirected to service agent 126 for verifying the calling party's identity. If the fraud database returns a "no fraud" determination, then the switch 124 obtains routing information from a routing database 170 and completes the call to station 150 utilizing known routing techniques. In this exemplary embodiment, the routing database 170 may provide one of two routes for connecting station 110 (which is connected directly with exchange 120) to station 150 (which is connected directly with exchange 140). The first route may be via trunk group 127 and the second route may be via trunk group 125 followed by trunk group 135.

A call may fall into a third category besides fraudulent and non-fraudulent. The third category may be labeled as a potentially fraudulent call or a call of interest for monitoring and tracing purposes, for example. It may also be referred to as a suspicious call or a questionable call as well. If a customer with no prior history or record in the fraud database 160 initiates a call for example, the comparison by processor 122 may not be possible as there is no archived information about the call on which to base the comparison. In this situation, the call may be treated as a potentially fraudulent call. In a fraud routing method according to exemplary embodiments of the present invention, calls in this third category (i.e., potential fraudulent calls) may be routed through a specific, predetermined route in order to facilitate control of the call, such as monitoring and terminating the call.

Figure 2:
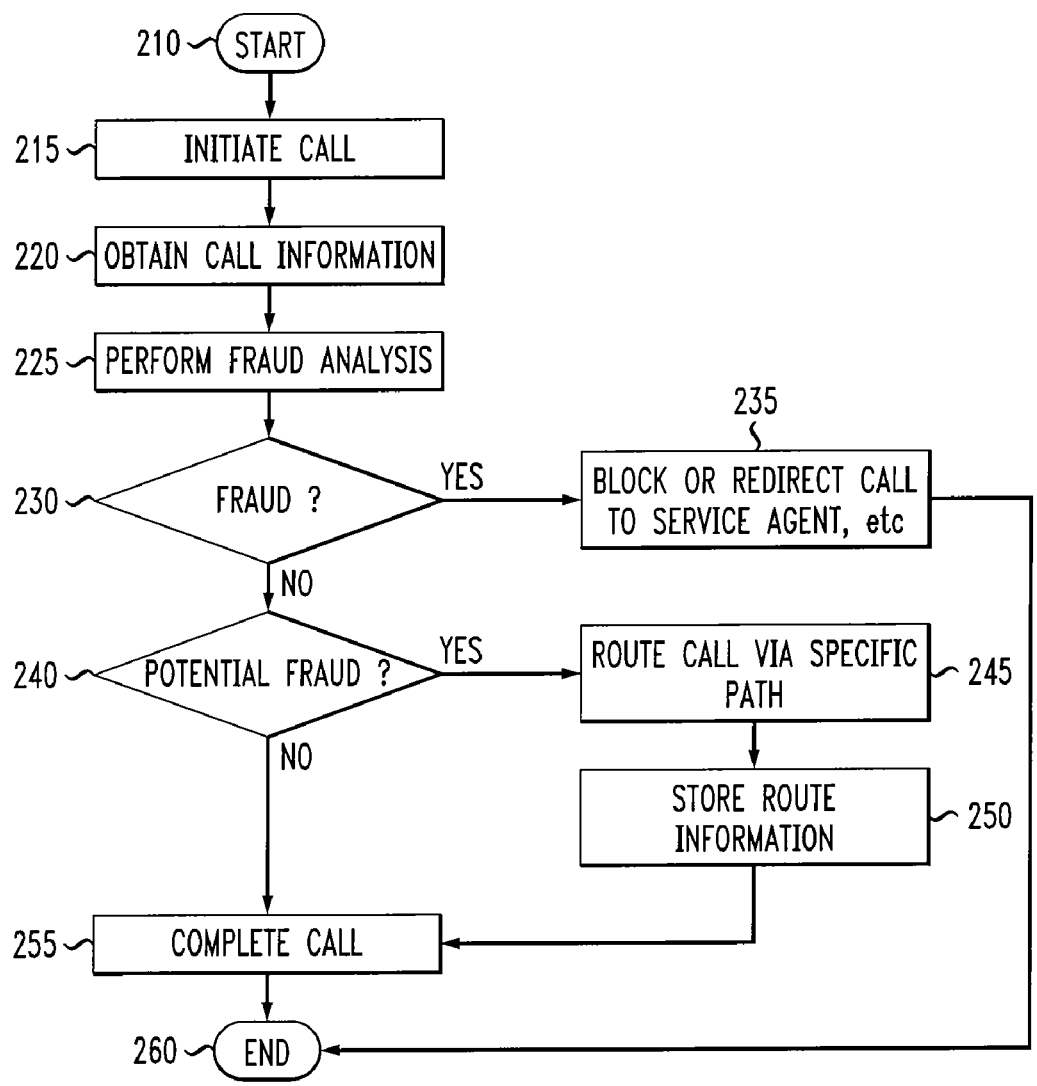
FIG. 2 illustrates a fraud detection method according to exemplary embodiments of the present invention.

FIG. 2 illustrates a method of routing potentially fraudulent calls according to an exemplary embodiment of the present invention. A call process starts at step 210 and a call is initiated at step 215. A processor such as processor 122 of FIG. 1B obtains call information from the initiated call at step 220. The call information may include, among other things, call origination number, call destination number, calling card number, PIN and credit card number as described above. The call information is analyzed for fraud at step 225. This analysis may involve comparing some or all of the call information with archived information from fraud database 160 of FIGS. 1A and 1B for example. If the comparison results in a finding of fraudulent activity at step 230, the call is either terminated (blocked) or directed to a service agent for further processing at step 235. The details of this particular function are well known and therefore are not described further.

If the comparison at step 230 does not result in a finding of fraud, the call is examined for potential fraud at step 240. A call may be considered potentially fraudulent if one or more of the following exemplary conditions are satisfied: (1) the call origination number may not have either an entry or a history in the fraud database as it was recently assigned; (2) repeated calls to a number that corresponds to a pay phone in an area having a reputation for illicit activity such as drug dealing or gang activity; (3) calls between locations known to have a high incidence of fraud; (4) a station with recent history of calls having a long duration; and (5) a single location with many non-business lines. The potential fraudulent conditions may be included in the fraud database. The conditions triggering a potential fraudulent conclusion may not meet the threshold for actual fraud under existing fraud detection methods. In addition, a potential fraud condition may or may not lead to actual fraudulent activity.

If the call is deemed to be potentially fraudulent (or suspicious or considered to be a call of interest such as in a wiretapping), the call is routed through a specific route (path) at step 245. Specific paths between two exchanges may be designated in advance for routing calls belonging to this category. With respect to FIG. 1A, a potentially fraudulent call from station 110 to station 150 may be routed via each of the exchanges 120, 130 and 140 for example (i.e., instead of through 120 and 140). The path to follow may be specified by a routing database such as routing database 170 of FIGS. 1A and 1B for example. The particular path specified for the potentially fraudulent call may be stored at step 250 and the call is completed at step 255. The path information may be stored in memory 175 of routing database 170 as illustrated in FIG. 1B. Memory 175 may occupy one or more memory locations. Since a potentially fraudulent call does not meet the threshold for an actual fraudulent call, the potentially fraudulent call is routed to station 150 via the specified route. However, in order to maintain control over the potentially fraudulent call, the call needs to be located if subsequent activity during the phone call changes the call status to an actual fraudulent call. A potentially fraudulent call may change to an actual fraudulent call if, for example, the call has a very long duration, such as several days, or if a large number of calls are charged to the same credit number and if many simultaneous calls are charged to the same billing account. Storage of the routing information for a specific call facilitates tracing or monitoring of the call after it is completed (i.e., communication between the stations established) and while it is in progress.

If the determination at step 240 is that the call is not a potentially fraudulent call, then the call is completed using known techniques at step 255. With respect to FIG. 1A, this call (i.e., neither fraudulent nor potentially fraudulent) from station 110 to station 150 may be routed via exchanges 120 and 140 (without using exchange 130) for example.

For purposes of this invention, the calling or the called party equipment (stations 110 and 150 for example) is not limited to a personal telephone. It may be a pay phone, a modem, a cell phone or the like. The phone call may also be initiated automatically or at a predetermined time or upon the occurrence of a predetermined event. The information being conveyed between the originating and destination stations is not limited to voice data as it may be non-voice data or data signals or the like. The service agent invoked for fraudulent calls may be a human or a computer. While the description refers to potentially fraudulent calls, the calls requiring monitoring and tracing may be questionable calls or calls exhibiting suspicious characteristics even if not fraudulent or not potentially fraudulent. The importance of having an ability to monitor questionable or suspicious calls is evident in light of recent events.

In addition to blocking and redirecting of calls, telephony service operators can also establish other (i.e., different) dispositions for a call. For example, if the call is suspected of being potentially fraudulent or if it is determined that the call should be monitored for some other purpose (based on criteria in a database), then the call may be completed to the second station via a path that is reserved for special purposes. This path may not be used for ordinary call completions and may be referred to as a dedicated path. The selection of a specific path, or route, is obtained or determined from the fraud analysis. The route selected for the call is predetermined and may be a static route or a dynamic route or a combination of both. With respect to FIG. 1A for example, a potentially fraudulent call or a call deemed to be a call of interest from station 110 to station 150 may always be routed from exchange 120 to exchange 130 (the static portion) and from exchange 130 to exchange 140 either directly or via another exchange (the dynamic portion—this other exchange is not illustrated). The route selected may be based on the functionality desired and the most efficient means for incorporating all such functionalities on the route. The routing of the call through a special route provides the network operator (or telephony service operator) special access and capabilities to monitor and control the call. An operator of a large network may have multiple routes available and each route may support various capabilities.

By routing along specific routes, calls can be forced to "pass-through" certain machines, computers, servers and switches which enable certain capabilities for the network operator that are not normally available. These include the ability to cut-off or terminate a call by the network operator, listen in on the call without the participant's knowledge, electronically analyze the call (voice or sound energy) to determine contents of the call (such as data, voice signatures, etc.) and to gather other special metrics. The method of the present invention is applicable to packet or data networks.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention.

The following claims and their equivalents define the scope of the invention.

What is claimed is:

1. A call processing method, comprising:
   initiating a call by a first station to a second station;
   evaluating call information associated with the call by comparing the call information with information in a first database;
   preventing a completion of the call if the evaluating results in a finding of fraud; and
   completing the call to the second station via a specific routing path obtained from a routing database if the evaluating results in a finding of potential fraud for the call.

2. The method of claim 1, further comprising:
   storing information corresponding to the specific routing path if the call is deemed to be a call of interest.

3. The method of claim 2, wherein the specific routing path for the call of interest comprises a dedicated path between the first station and the second station.

4. The method of claim 2, wherein the call of interest is a court-ordered, wire-tapping call.

5. The method of claim 1, wherein the call is deemed a potentially fraudulent call according to a criterion in the first database.

6. The method of claim 2, wherein the call of interest is controlled utilizing the information from the storing.

7. The method of claim 2, wherein the call of interest is monitored utilizing the information from the storing.

8. The method of claim 2, wherein the call of interest is terminated utilizing the information from the storing.

9. The method of claim 1, wherein a portion of the specific routing path between the first and second stations is static.

10. The method of claim 1, wherein a portion of the specific routing path between the first and second stations is dynamic.

11. A communication system, comprising:
    a plurality of stations for handling calls;
    a plurality of exchanges intermediate the plurality of stations; and
    a plurality of paths connecting the plurality of stations via the plurality of exchanges, wherein a call from one of the plurality of stations to another of the plurality of stations is routed via a dedicated path of the plurality of paths if the call is deemed to be a call of interest and a routing information associated with the dedicated path is stored.

12. The communication system of claim 11, wherein a portion of the dedicated path is dynamic.

13. The communication system of claim 11, wherein a portion of the dedicated path is static.

14. The communication system of claim 11, further comprising a plurality of databases.

15. The communication system of claim 14, wherein one of the plurality of databases is a fraud database.

16. The communication system of claim 14, wherein one of the plurality of databases is a routing database.

17. The communication system of claim 16, wherein the routing database comprises a memory location for storing the routing information associated with the dedicated path.

18. The communication system of claim 11, wherein one of the exchanges comprises a service agent.

19. The communication system of claim 11, wherein one of the plurality of exchanges comprises a switch.

20. A computer-readable medium containing instructions for controlling a processor to perform a call processing method comprising:
    initiating a call by a first station to a second station;
    evaluating call information associated with the call by comparing the call information with information in a first database;
    preventing a completion of the call if the evaluating results in a finding of fraud; and
    completing the call to the second station via a specific routing path obtained from a routing database if the evaluating results in a finding of potential fraud for the call.

* * * * *